(12) United States Patent
Rom

(10) Patent No.: US 7,611,094 B2
(45) Date of Patent: Nov. 3, 2009

(54) UNMANNED AERIAL VEHICLE (UAV) DECELERATION SYSTEM

(75) Inventor: Hanan Rom, Gilon (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 359 days.

(21) Appl. No.: 11/139,483

(22) Filed: May 31, 2005

(65) Prior Publication Data
US 2007/0023568 A1    Feb. 1, 2007

(30) Foreign Application Priority Data
May 30, 2004    (IL)    ................................. 162224

(51) Int. Cl.
*B64F 1/02*    (2006.01)
(52) U.S. Cl. .................. 244/110 C; 244/110 F
(58) Field of Classification Search .............. None
See application file for complete search history.

(56) References Cited

U.S. PATENT DOCUMENTS

| | | | | |
|---|---|---|---|---|
| 2,342,773 | A * | 2/1944 | Wellman | 114/261 |
| 2,465,936 | A * | 3/1949 | Schultz | 244/110 R |
| 2,957,657 | A * | 10/1960 | Frieder et al. | 244/110 R |
| 3,114,522 | A * | 12/1963 | Mortimer | 244/110 A |
| 3,367,608 | A * | 2/1968 | Charno et al. | 244/110 R |
| 4,147,317 | A | 4/1979 | Mayhew | |
| 4,566,658 | A * | 1/1986 | DiGiovanniantonio et al. | 244/110 R |
| 4,753,400 | A | 6/1988 | Reuter | |
| 4,768,417 | A * | 9/1988 | Wright | 89/1.11 |
| 4,809,933 | A * | 3/1989 | Buzby et al. | 244/110 C |
| 5,069,109 | A * | 12/1991 | Lavan, Jr. | 89/1.11 |
| 5,109,788 | A | 5/1992 | Heinzmann | |
| H001133 | H * | 2/1993 | Bridges et al. | 244/110 C |
| 5,560,568 | A | 10/1996 | Schmittle | |
| 5,583,311 | A * | 12/1996 | Rieger | 89/1.11 |
| 6,123,294 | A * | 9/2000 | Genovese | 244/110 C |
| 6,264,140 | B1 * | 7/2001 | McGeer et al. | 244/110 F |
| 6,394,016 | B2 * | 5/2002 | Swartout et al. | 114/254 |
| 6,416,019 | B1 | 7/2002 | Hilliard et al. | |
| 6,626,077 | B1 * | 9/2003 | Gilbert | 89/1.11 |
| 6,695,255 | B1 * | 2/2004 | Husain | 244/110 E |

(Continued)

FOREIGN PATENT DOCUMENTS

GB    578440    6/1946

(Continued)

OTHER PUBLICATIONS

"Mini-RPV Recovery System Conceptual Study" Dickard, H., Teledyn Ryan Aeronautical, San Diego, California, Contract DAAJ02-76-C-0048, Aug. 1977.*

*Primary Examiner*—Michael R Mansen
*Assistant Examiner*—Joseph W Sanderson
(74) *Attorney, Agent, or Firm*—Mark M. Friedman

(57) ABSTRACT

A system for slowing an air vehicle, including an independently supported aerodynamic drag device designed so that, after contact is made between the flying air vehicle and the aerodynamic drag device, one or more parts of the aerodynamic drag device are carried along by the air vehicle thereby decelerating the air vehicle, so that a majority of a kinetic energy dissipation of a combination of the air vehicle and the aerodynamic drag device is due to an aerodynamic drag of the aerodynamic drag device.

9 Claims, 1 Drawing Sheet

U.S. PATENT DOCUMENTS

| | | | |
|---|---|---|---|
| 6,789,979 B1 * | 9/2004 | Jones | 404/6 |
| 6,843,613 B2 * | 1/2005 | Gelfand et al. | 404/6 |
| 6,904,838 B1 * | 6/2005 | Dindl | 89/1.1 |
| 7,059,564 B2 * | 6/2006 | Dennis | 244/110 F |
| 7,066,430 B2 * | 6/2006 | Dennis et al. | 244/110 F |

FOREIGN PATENT DOCUMENTS

| WO | WO01/07318 | 2/2001 |
|---|---|---|

* cited by examiner

UNMANNED AERIAL VEHICLE (UAV) DECELERATION SYSTEM

FIELD AND BACKGROUND OF THE INVENTION

The present invention relates to an air vehicle deceleration system and, in particular, it concerns an air vehicle deceleration system operating by aerodynamic drag.

Of relevance to the present invention is U.S. Pat. No. 6,416,019 to Hilliard, et al. which teaches a parachute recovery system for recovering a payload such as a target drone. The parachute system is fitted to the drone and is released at the appropriate time. A shortcoming of the aforementioned system is due to the need for having a parachute for every drone. Additionally, the parachute adds unwanted mass to the drone during flight of the drone.

Also of relevance to the present invention is U.S. Pat. No. 5,560,568 to Schmittle, which teaches deploying an inflatable balloon attached to the fuselage of the aircraft in order to cushion the landing of the aircraft. A shortcoming of the aforementioned system is due to the need for having a balloon and inflation equipment for every aircraft. Additionally, the balloon and its inflation equipment add unwanted mass to the drone during flight of the drone.

Also of relevance to the present invention are U.S. Pat. No. 4,753,400 to Reuter, et al., U.S. Pat. No. 4,147,317 to Mayhew et al., U.S. Pat. No. 5,109,788 to Heinzmann and P.C.T. Publication No. WO 01/07318 to McDonnell. These publications teach various embodiments for slowing an unmanned air vehicle (UAV) employing a supported net for catching the UAV. A shortcoming of the aforementioned systems is that the supported net slows down the UAV too abruptly which can lead to damage of the UAV.

There is therefore a need for an independent system for slowing down a UAV that provides a gentle slowing effect.

SUMMARY OF THE INVENTION

The present invention is an air vehicle deceleration system construction and method of operation thereof.

According to the teachings of the present invention there is provided, a system for slowing an air vehicle, comprising an independently supported aerodynamic drag device configured such that, after contact is made between the flying air vehicle and the aerodynamic drag device, at least part of the aerodynamic drag device is carried along by the air vehicle thereby decelerating the air vehicle, wherein a majority of a kinetic energy dissipation of a combination of the air vehicle and the aerodynamic drag device is due to an aerodynamic drag of the aerodynamic drag device.

According to a further feature of the present invention, at least 90 percent of the kinetic energy dissipation is due to the aerodynamic drag.

According to a further feature of the present invention, the aerodynamic drag device includes a fabric sheet and a frame system mechanically connected to the sheet, the frame system and the sheet being configured such that, after contact is made between the flying air vehicle and the sheet, the sheet is at least partially draped around the air vehicle.

According to a further feature of the present invention, at least 90 percent of the kinetic energy dissipation is due to the aerodynamic drag of the sheet.

According to a further feature of the present invention, the frame system includes at least two elongated elements, each of the elongated elements having a direction of elongation, the elongated elements being disposed such that the directions of elongation are substantially parallel to each other, the sheet being slidably connected to the elements.

According to a further feature of the present invention, the frame system includes at least four elongated elements, each of the elongated elements having a direction of elongation, the elongated elements being disposed such that the directions of elongation are substantially parallel to each other, the sheet being slidably connected to the elements.

A method for slowing down an air vehicle, comprising the steps of: (a) flying the air vehicle toward an aerodynamic drag device; (b) making contact between the air vehicle and the aerodynamic drag device while the air vehicle is airborne; and (c) carrying along at least part of the aerodynamic drag device by the air vehicle thereby causing a deceleration of the air vehicle by the aerodynamic drag device, wherein a majority of a kinetic energy dissipation of a combination of the air vehicle and the aerodynamic drag device is due to an aerodynamic drag of the aerodynamic drag device.

According to a further feature of the present invention, at least 90% of the kinetic energy dissipation is due to aerodynamic drag.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an air vehicle deceleration system construction and method of operation thereof.

The principles and operation of an air vehicle deceleration system according to the present invention may be better understood with reference to the drawings and the accompanying description.

Figure 1:
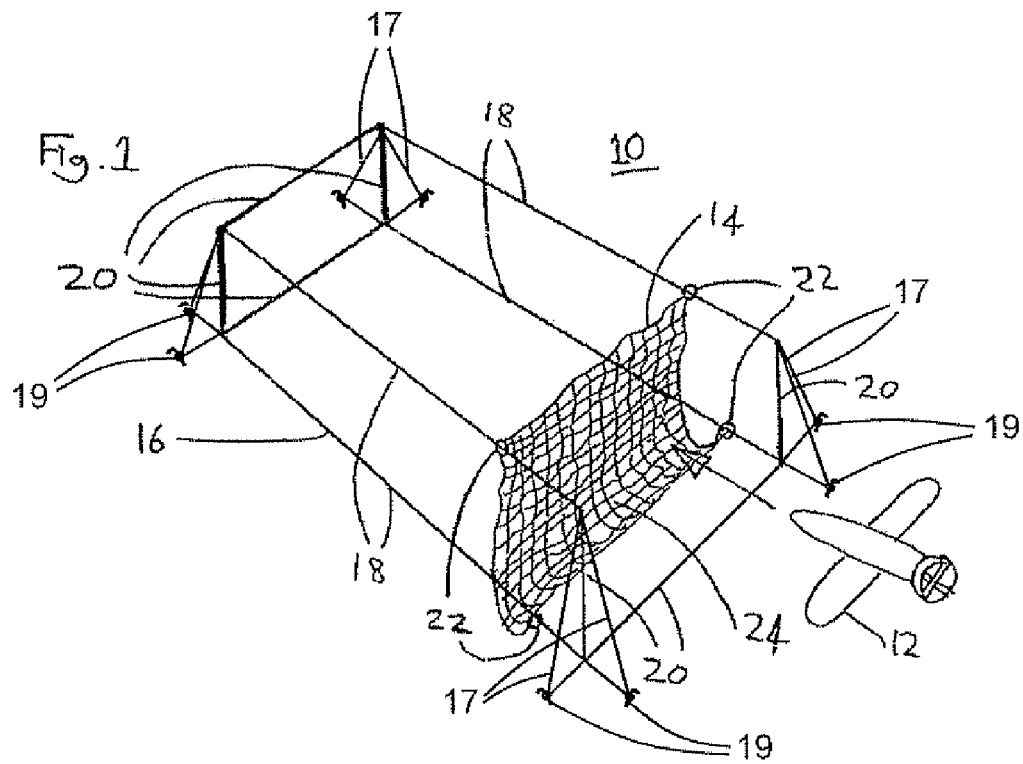
FIG. 1 is a perspective view of an air vehicle deceleration system, prior to contact of an air vehicle with the deceleration system, that is constructed and operable in accordance with a preferred embodiment of the invention.
Figure 2:
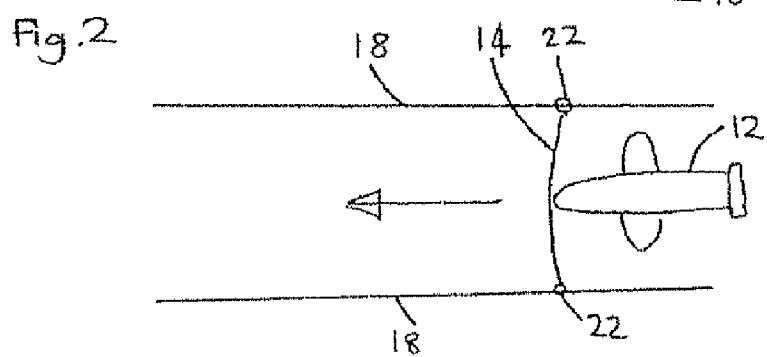
FIG. 2 is a schematic plan view of the air vehicle deceleration system of FIG. 1, at a time of contact between the air vehicle and the deceleration system.
Figure 3:
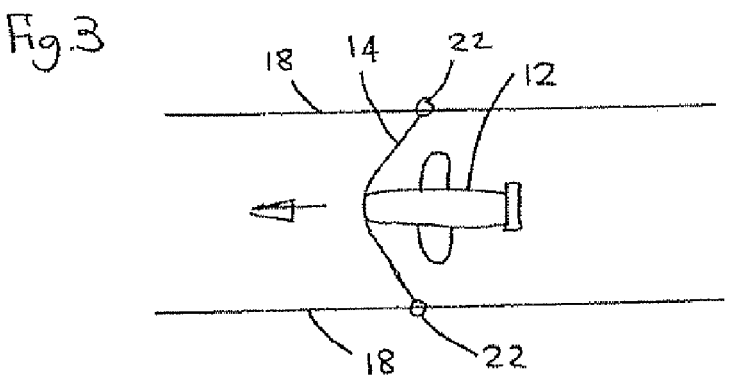
FIG. 3 is a schematic plan view of the air vehicle deceleration system of FIG. 1, after contact has been achieved between the air vehicle and the deceleration system.

Reference is now made to FIGS. 1 to 3. FIG. 1 is a perspective view of an air vehicle deceleration system 10, prior to contact of an air vehicle 12 with air vehicle deceleration system 10 that is constructed and operable in accordance with a preferred embodiment of the invention. FIG. 2 is a schematic plan view of air vehicle deceleration system 10, at a time of contact between air vehicle 12 and air vehicle deceleration system 10. FIG. 3 is a schematic plan view of air vehicle deceleration system 10 of FIG. 1, after contact has been achieved between air vehicle 12 and air vehicle deceleration system 10. Air vehicle deceleration system 10 is an independently supported aerodynamic drag device for decelerating air vehicle 12. Air vehicle deceleration system 10 is defined herein as "independently supported" in that air vehicle deceleration system 10 is supported independently of air vehicle 12 and is not mechanically connected to air vehicle 12 during normal flight of air vehicle 12. The term "normal flight" is defined herein to exclude during landing of air vehicle 12 where air vehicle 12 and air vehicle deceleration system 10 make contact, as will be described in more detail below. Air vehicle deceleration system 10 includes a fabric sheet 14 and a frame system 16. The term "fabric" is defined herein to include woven and non-woven materials. Fabric sheet 14 is typically formed from a woven material having wide intervals, for example a net or mesh. By way of a non-limiting example, when air vehicle 12 is approximately 7 kg, fabric sheet 14 can be a commercial fishing net having threads formed from multiple twisted strands, each thread having a diameter of approximately 1.5 mm, the spacing between strands being approximately 6 cm. Fabric sheet 14 is typically a rectangular fabric sheet having four corners. Frame system 16 includes four elongated elements 18 and upright support members 20. Support members 20 are maintained in an upright position using guy ropes 17 and pegs 19. Each of elongated elements 18 has a direction of elongation. Elongated elements 18 are supported at their ends by support members 20 such that, the directions of elongation of elongated elements 18 are substantially parallel to each other. Support members 20 are typically formed from composite materials, for example, but not limited to carbon-epoxy, graphite-epoxy and fiberglass. Elongated elements 18 are typically metal bars or wire under tension. Each of the four corners of fabric sheet 14 is slidably connected to one elongated element 18 using a connection element 22. Connection element 22 is, for example, a ring. The height of fabric sheet 14 is typically greater than the height of the upright support members 20. The height of fabric sheet 14 is configured this way, so that fabric sheet 14 creates a pocket 24 for air vehicle 12 to rest upon (FIG. 1). Pocket 24 prevents air vehicle 12 falling to a substrate below air vehicle deceleration system 10 when air vehicle 12 is stationary. Air vehicle deceleration system 10 is configured such that, after contact is made between the flying air vehicle 12 and fabric sheet 14, fabric sheet 14 is at least partially draped around the front of air vehicle 12 and fabric sheet 14 is carried along by air vehicle 12. Fabric sheet 14 typically has an aerodynamic drag significantly greater than that of the air vehicle 12, thereby decelerating air vehicle 12. Elongated elements 18 guide the movement of fabric sheet 14. Additionally, elongated elements 18 prevent fabric sheet 14 from completely collapsing and wrapping around air vehicle 12. Due to the conservation of momentum, a portion of the deceleration of air vehicle 12 is due to momentum conservation during and after contact of air vehicle 12 with fabric sheet 14. The exact amount of deceleration of air vehicle 12 due to momentum depends on the mass of air vehicle 12, the mass of fabric sheet 14 and other factors relating to the nature of the contact between air vehicle 12 and fabric sheet 14. The slowing of air vehicle 12 not due to momentum conservation is defined in terms of kinetic energy dissipation of a combination of air vehicle 12 and air vehicle deceleration system 10. A majority, preferably at least 90%, of the kinetic energy dissipation of the combination of air vehicle 12 and air vehicle deceleration system 10 is due to aerodynamic drag of fabric sheet 14.

The directions of elongation of elongated elements 18 are described as being "substantially parallel". The term "substantially parallel" is defined herein as, not necessarily exactly parallel, the directions of elongation of elongated elements 18 being sufficiently parallel such that a majority, preferably at least 90%, of the kinetic energy dissipation is due to aerodynamic drag of fabric sheet 14. For example, elongated elements 18 may converge or diverge to control the slowing of air vehicle 12 due to friction between elongated elements 18 and connection element 22. The aerodynamic drag of fabric sheet 14 typically depends on the effective surface area of fabric sheet 14. For example, for a woven net, the aerodynamic drag typically depends on the diameter of the strands used, the total length of strands used and the distance between the strands.

In operation, fabric sheet 14 is positioned at the upwind end of elongated elements 18 closest to an approaching air vehicle 12. Air vehicle 12 is guided and flown toward air vehicle deceleration system 10 (FIG. 1). Air vehicle 12 makes contact with fabric sheet 14 while air vehicle 12 is airborne (FIG. 2). Air vehicle 12 carries fabric sheet 14 along in the direction of elongation of elongated elements 18, thereby causing a deceleration of air vehicle 12. A majority, preferably at least 90%, of the kinetic energy dissipation of the combination of air vehicle 12 and air vehicle deceleration system 10 is due to an aerodynamic drag of fabric sheet 14.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art which would occur to persons skilled in the art upon reading the foregoing description.

What is claimed is:

1. A system for slowing an air vehicle, comprising an independently supported aerodynamic drag device, having a fabric sheet, and a frame system comprising:
   a) at least two upright support members;
   b) at least two elongated elements, each of said elongated elements having a direction of elongation, said elongated elements being disposed such that said directions of elongation are substantially parallel to each other, wherein said fabric sheet is slidably connected to said elongated elements substantially along a forward direction of travel of the air vehicle; and
   wherein said system for slowing an air vehicle is configured such that, after contact is made between the flying air vehicle and said aerodynamic drag device, at least part of said aerodynamic drag device is carried along by the air vehicle thereby decelerating the air vehicle, wherein a majority of a kinetic energy dissipation of a combination of the air vehicle and said aerodynamic drag device is due to an aerodynamic drag of said fabric sheet.

2. The system of claim 1, wherein at least 90 percent of said kinetic energy dissipation is due to said aerodynamic drag.

3. The system of claim 1, wherein said frame system and said sheet being configured such that, after contact is made between the flying air vehicle and said sheet, said sheet is at least partially draped around the air vehicle.

4. The system of claim 1, wherein at least 90 percent of said kinetic energy dissipation is due to said aerodynamic drag of said sheet.

5. The system of claim 1, wherein said frame system includes at least four elongated elements, each of said elongated elements having a direction of elongation, said elongated elements being disposed such that said directions of elongation are substantially parallel to each other, said sheet being slidably connected to said elongated elements.

6. The system of claim 1, wherein said upright support members are maintained in an upright position using guy ropes and pegs.

7. A method for slowing down an air vehicle, comprising the steps of: (a) flying the air vehicle toward an aerodynamic drag device, having a fabric sheet, at least two upright support members and at least two elongated elements, each of said elongated elements having a direction of elongation, said elongated elements being disposed such that said directions of elongation are substantially parallel to each other, wherein said fabric sheet is slidably connected to said elongated elements substantially along a forward direction of travel of the air vehicle; (b) making contact between the air vehicle and said aerodynamic drag device while the air vehicle is airborne; and (c) carrying along at least part of said aerodynamic drag device by the air vehicle thereby causing a deceleration of the air vehicle by said aerodynamic drag device, wherein a majority of a kinetic energy dissipation of a combination of the air vehicle and said aerodynamic drag device is due to an aerodynamic drag of said aerodynamic drag device.

8. The method of claim 7, wherein at least 90% of said kinetic energy dissipation is due to aerodynamic drag 9. The method of claim 7, wherein said upright support members are maintained in an upright position using guy ropes and pegs.

* * * * *